(12) United States Patent
Smith et al.

(10) Patent No.: US 7,246,686 B2
(45) Date of Patent: Jul. 24, 2007

(54) POWER SUPPLY FOR ELEVATOR SYSTEMS HAVING VARIABLE SPEED DRIVES

(75) Inventors: Rory Smith, El Cajon, CA (US); Hien T. Nguyen, Germantown, TN (US)

(73) Assignee: Thyssen Elevator Capital Corp., Whittier, CA (US)

( * ) Notice: Subject to any disclaimer, the term of this patent is extended or adjusted under 35 U.S.C. 154(b) by 386 days.

(21) Appl. No.: 10/769,527

(22) Filed: Jan. 30, 2004

(65) Prior Publication Data
US 2005/0224296 A1 Oct. 13, 2005

(51) Int. Cl.
*B66B 1/06* (2006.01)
(52) U.S. Cl. ..................... 187/290; 187/297
(58) Field of Classification Search ........... 187/290, 187/277, 293, 295, 296, 297
See application file for complete search history.

(56) References Cited

U.S. PATENT DOCUMENTS

| | | | |
|---|---|---|---|
| 5,070,290 A | 12/1991 | Iwasa et al. | |
| 5,485,896 A | 1/1996 | Kowalczyk et al. | |
| 5,896,948 A | 4/1999 | Suur-Askola et al. | |
| 6,431,323 B2 | 8/2002 | Tajima et al. | |
| 6,431,324 B2 | 8/2002 | Tajima et al. | |
| 6,439,347 B2 | 8/2002 | Suga et al. | |
| 6,732,838 B1* | 5/2004 | Okada et al. | 187/290 |
| 6,742,630 B2* | 6/2004 | Eilinger | 187/290 |
| 6,938,733 B2* | 9/2005 | Eilinger | 187/290 |

* cited by examiner

*Primary Examiner*—Jonathan Salata
(74) *Attorney, Agent, or Firm*—Frost Brown Todd LLC

(57) ABSTRACT

An improved system of variable speed drives that enhances the energy efficiency of an elevator system by enabling power transfer between the variable speed drives of two or more elevators via a common DC bus. Any combination of regenerative and non-regenerative variable speed drives may be used with the present invention. Energy storage devices may be connected to the common DC bus further improve efficiency.

12 Claims, 1 Drawing Sheet

POWER SUPPLY FOR ELEVATOR SYSTEMS HAVING VARIABLE SPEED DRIVES

FIELD OF THE INVENTION

The present invention relates generally to the field of elevator systems, and, more particularly, to the field of variable speed drives (VSD) for elevator systems.

BACKGROUND

Variable Speed Drives (VSD) for elevators are typically produced in two types, regenerative and non-regenerative. Both these types of VSDs are capable of producing alternating current (AC) or direct current (DC).

During each trip, an elevator either consumes energy or produces energy. When the elevator has an overhauling load, the motor functions as a generator and returns energy to the drive. A non-regenerative VSD will convert this energy to heat by use of dynamic braking (DB) transistors. A regenerative VSD will return energy to the AC power supply grid.

An elevator with a regenerative drive in total consumes no energy except for energy lost due to friction, power conversion, ventilation, illumination, signaling and control. An elevator converts kinetic energy to potential energy and then reconverts the potential energy to kinetic energy.

While regenerative power presents no problems for a power system, it can pose problems for emergency power systems. Often specifications require elevator drives that do not produce regenerative currents when the emergency power system is in operation. Virtually all high rise and most mid-rise buildings have emergency generators.

The conversion of energy from AC to DC and from DC to AC in elevator drive systems involves losses. In modern insulated gate bipolar transistor (IGBT) based VSDs, these losses are typically 3 to 5 percent per conversion. In a typical drive system, the drive receives three-phase AC power from a supply grid and immediately converts this power to DC. The DC power is applied to a DC bus that has a bank of capacitors connected to it. The capacitors' primary function is to eliminate any residual AC component from the DC power. This AC component is known as ripple.

An inverter is also connected to the DC bus. The inverter converts the DC to variable voltage variable frequency (VVVF) AC that is supplied to an AC motor. If the motor connected to the drive is a DC motor, as is often the case with modern elevators, then the inverter produces a variable voltage direct current (VVDC).

Emergency power generators normally are sized to run one elevator at a time. In an elevator system having more than one elevator, it is often the case that one elevator is producing energy while another elevator is consuming energy. The regenerated power has been used to operate more than one elevator using a generator that would otherwise run only one elevator at a time. However, the power transfer in the prior art takes place via the AC power bus. Transfer on an AC power bus requires two additional AC/DC conversions at a loss of 6 to 10 percent.

SUMMARY OF THE INVENTION

The present invention is an improved system of variable speed drives (VSD) for groups of two or more elevators that improves the energy efficiency of the system. In this system, the DC buses of the VSDs are connected by a common DC bus such that regenerated power can be transferred between VSDs via the common DC bus. Thus, the present invention is directed to an energy-efficient elevator system of two or more elevators, each elevator having a variable speed drive connected to a common DC bus such that the variable speed drive of each elevator is capable of supplying power to the common DC bus when the elevator produces energy and is capable of consuming power from the common DC bus when the elevator is in need of energy. Any combination of regenerative and non-regenerative variable speed drives may be used in connection with the present invention, including an embodiment having only non-regenerative drives. Energy storage devices, such as direct current capacitors, may be connected to the common DC bus. A regenerative resistor may be connected to the common DC bus. The variable speed drives of the present invention may comprise regenerative control circuitry, bus voltage sensors, inverters, converters, speed control circuitry, and elevator control circuitry. The system may be powered by a three-phase power source.

DETAILED DESCRIPTION OF THE INVENTION

Figure 1:
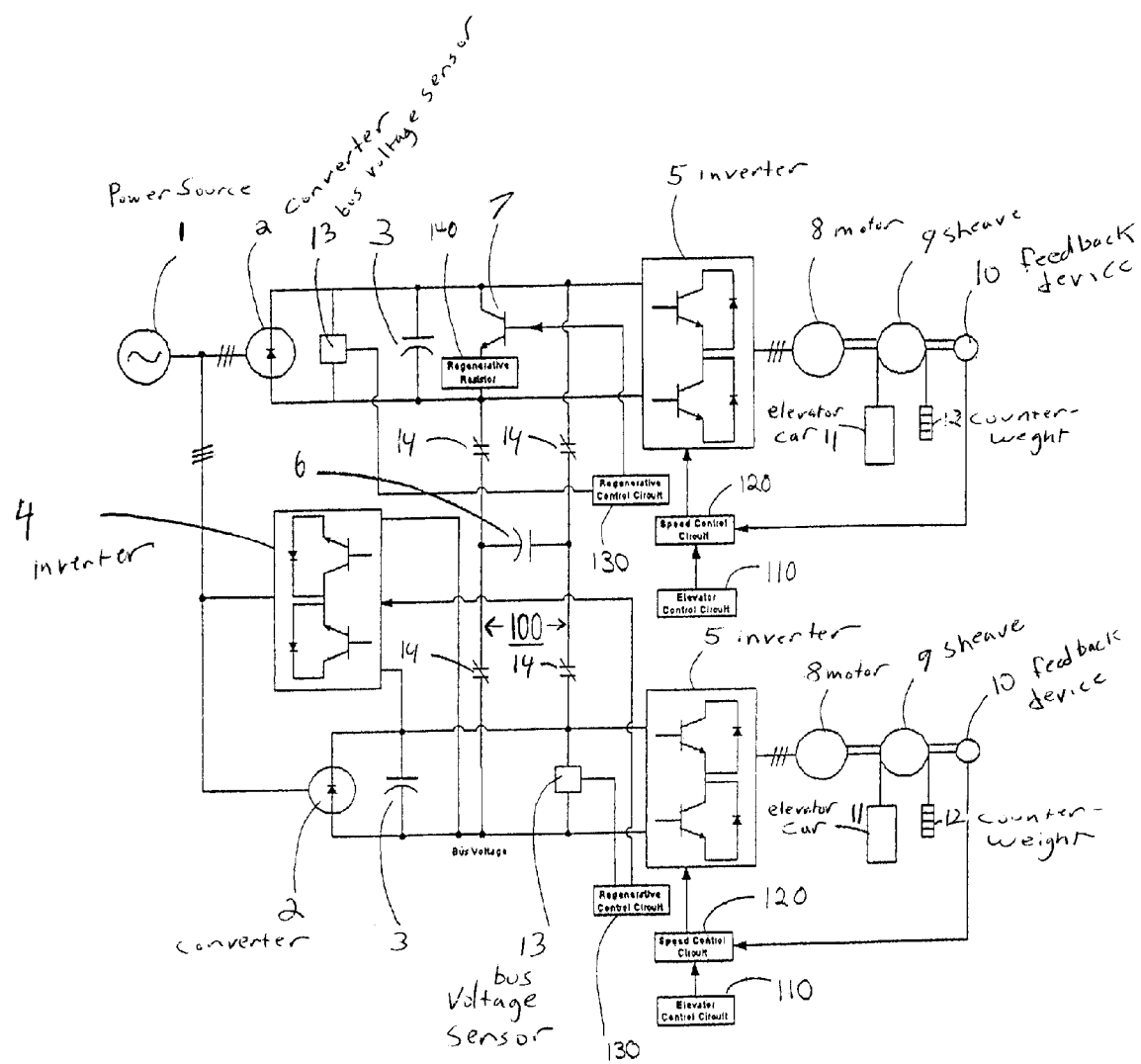
FIG. 1 is a circuit diagram depicting an embodiment of the present invention.

The present invention is an improved system of VSDs for groups of two or more elevators that enhances the energy efficiency of an elevator system. The present invention will now be described with reference to the FIG. 1.

In the present invention, the DC buses of the VSDs of each elevator in the system are connected via a common DC bus 100. Thus, if one elevator is producing energy while another is consuming energy, the regenerated energy is transferred via the common DC bus 100.

FIG. 1 shows an embodiment of the invention containing a non-regenerative VSD (upper portion of the figure) and a regenerative VSD (lower portion of the figure) connected to a common DC bus 100. A three-phase or single-phase power source supply grid 1 powers the VSDs. Each VSD comprises a converter 2 that converts the AC power generated by the power source 1 to DC power, a DC bus capacitor 3, a bus voltage sensor 13, and an inverter 5 that converts DC power to AC power to drive a motor 8. Under the control of the elevator control circuit 110 and speed control circuit 120, the motor 8 generates a drive torque on an elevator sheave 9. The weight imbalance between the load in the elevator car 11 and elevator counterweight 12 creates a load torque on the elevator sheave 9. Together, the drive torque and load torque cause the elevator car 11 to rise or descend. The elevator consumes energy when the elevator car 11 moves in a direction opposite the load torque, such as when the elevator car 11 (and contents) is heavier than the counterweight 12 and moving up, or lighter than the counterweight 12 and moving down. Energy is produced when the elevator car 11 is moving in the same direction as the load torque.

According to the invention, the two VSDs are connected to the common DC bus 100 via contactors 14. Under the control of the feedback device 10, the elevator control circuit 110, the speed control circuit 120, and the regenerative control circuit, the energy generated by each elevator when it is in an overhauling state may be supplied directly to the common DC bus 100 where it will be available for other VSDs in the system in need of power. In addition, the non-regenerative VSD can convert the excess energy to heat via dynamic braking transistor 7 and regenerative resistor 140 and the regenerative VSD can return the excess energy to the AC supply grid through inverter 4. While like reference numerals have been used in the foregoing description for similar components, the components themselves may comprise different parts or may be of different values. For example, the internal construction of the regenerative control circuit 130 in the non-regenerative drive may be different than as compared to the regenerative control circuit 130 in the regenerative drive.

In a preferred embodiment, energy storage devices, such as capacitor 6, may be added to the common DC bus 100. Energy storage devices may comprise DC capacitors, supercapacitors, batteries, or any combinations of these devices. The quantity of capacitors in a VSD is typically defined by the requirement to filter ripple currents. However, if additional DC bus capacitors 6 are connected to the common DC bus 100, more DC power can be stored and less power is regenerated to the AC system. These additional energy storage devices reduce total energy consumption and reduce power peak loads.

Another embodiment of the present invention utilizes control algorithms to minimize power peaks. Commercial power customers are not only charged for the kilowatt hours consumed but also for the peak power demand and for power factor. The common DC bus in the present invention inherently reduces power peaks. Control algorithms also minimize power peaks. By monitoring the DC bus voltage and knowing the quantity of capacitors connected to the bus, one skilled in the art can calculate the quantity of energy available for use. This information is used in control algorithms to minimize peak current demand and reduce energy costs.

Non-regenerative drives are popular because of their lower initial cost. In a preferred embodiment of the present invention, a combination of regenerative and non-regenerative drives are used, all of which are connected by a common DC bus such that the elevator system is regenerative. In a system of two or more elevators, the ratio of non-regenerative to regenerative drives can be varied. The non-regenerative drive components lower the total initial cost of the regenerative elevator system. Regenerative elevator systems operate at unity power factor which further reduces energy costs.

Elevators must be removed from service for maintenance. In one embodiment of the present invention, the elevator system would have at least two elevators, one with a regenerative drive and the other with a non-regenerative drive. If the elevator with the regenerative drive were removed from the system, the other elevator would function as a non-regenerative elevator converting the regenerated power to heat via dynamic braking resistors.

In another embodiment of the present invention, all of the drives could be non-regenerative. Energy savings using a shared DC bus can still occur even if all drives are non-regenerative.

In a further embodiment of this invention all of the VSDs could be regenerative.

Numerous modifications and variations of the present invention are possible in light of the above teachings, and therefore, within the scope of the appended claims, the invention may be practiced otherwise than as particularly described.

What is claimed is:

1. A regenerative elevator system, the system comprising:
   two or more elevators, each elevator comprising a variable speed drive, each variable speed drive comprising a direct current bus, and further wherein at least one of the variable speed drives is non-regenerative and one of the variable speed drives is regenerative; and,
   a common direct current bus connected to the direct current bus of each variable speed drive, wherein the variable speed drive of each elevator is capable of supplying power to the common direct current bus when the elevator produces energy and capable of consuming power from the common direct current bus when the elevator consumes energy.

2. The elevator system of claim 1, wherein one or more energy storage devices are connected to the common direct current bus.

3. The elevator system of claim 2, wherein the energy storage devices are DC capacitors.

4. The elevator system of claim 1, wherein at least one regenerative resistor is connected to the direct current bus of one of the variable speed drives.

5. The elevator system of claim 4, wherein each variable speed drive comprises a regenerative control circuit that controls the supply of power to and consumption of power from the direct current bus of the variable speed drive.

6. The elevator system of claim 5, wherein each variable speed drive comprises a bus voltage sensor connected to and capable of determining the voltage of the common direct current bus.

7. The elevator system of claim 6, wherein each variable speed drive comprises an inverter that converts direct current power to alternating current power to drive a motor.

8. The elevator system of claim 7, wherein each inverter comprises a speed control circuit that controls the speed of the motor.

9. The elevator system of claim 8, wherein each inverter comprises an elevator control circuit that controls the operation of the elevator.

10. The elevator system of claim 1, the system comprising a three-phase power source that generates alternating current power.

11. The elevator system of claim 10, wherein each variable speed drive comprises a converter for converting the alternating current power supplied by the three-phase power source to direct current power.

12. A method of conserving energy in an elevator system comprising using the apparatus of claim 1.

* * * * *